United States Patent
Lachenmaier et al.

(10) Patent No.: US 8,349,107 B2
(45) Date of Patent: ***Jan. 8, 2013

(54) METHOD FOR ENERGY-EFFICIENT SEALING OF TUBULAR BAGS

(75) Inventors: Sepp Lachenmaier, Wuppertal (DE);
Harald Braun, Gruenberg (DE);
Erhard Lutz, Muecke-Sellnrod (DE)

(73) Assignee: Rovema GmbH, Fernwald-Annerod (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/286,582

(22) Filed: Nov. 1, 2011

(65) Prior Publication Data
US 2012/0167531 A1    Jul. 5, 2012

(30) Foreign Application Priority Data
Nov. 2, 2010 (DE) .................. 10 2010 050 008

(51) Int. Cl.
*B32B 37/00* (2006.01)
(52) U.S. Cl. ....... 156/64; 156/73.1; 156/308.4; 493/209
(58) Field of Classification Search ............... 156/64, 156/73.1, 290, 292, 308.2, 308.4; 493/189, 493/209
See application file for complete search history.

(56) References Cited

U.S. PATENT DOCUMENTS

| | | | | |
|---|---|---|---|---|
| 4,583,347 A | * | 4/1986 | Nielsen | 53/434 |
| 4,922,686 A | * | 5/1990 | Segota | 53/434 |

FOREIGN PATENT DOCUMENTS

| | | |
|---|---|---|
| DE | 2852727 A1 | 7/1980 |
| DE | 4425207 A1 | 1/1996 |
| DE | 69603212 T2 | 4/2000 |
| DE | 10243006 A1 | 3/2004 |
| DE | 102004049376 A1 | 4/2006 |
| DE | 102010048401 A1 | 4/2012 |
| EP | 0736456 A1 | 10/1996 |
| EP | 2441570 A2 | 4/2012 |

* cited by examiner

*Primary Examiner* — James Sells
(74) *Attorney, Agent, or Firm* — Fredrikson & Byron, P.A.

(57) ABSTRACT

The embodiments of the invention relate to a method for creating a force for a welding jaw of a vertical tubular bag machine. The welding jaw is moved back and forth along a path to strike a second welding jaw moving in the opposite direction. A tubular film is compressed between the second jaw and at least one sealing surface of the welding jaws, to weld the tubular film by ultrasonic vibrations applied thereto via the sealing surface at an applied pressure under a sealing force (Fs) within a sealing time (ts). The sealing force (Fs) is predetermined by a control unit such that the sealing force (Fs) runs along a sealing force curve within the sealing time (ts). The sealing force curve has a first relative sealing force maximum (Fs1) and at least one second relative sealing force maximum (Fs2), wherein (Fs1) is lower than (Fs2).

13 Claims, 4 Drawing Sheets

METHOD FOR ENERGY-EFFICIENT SEALING OF TUBULAR BAGS

CROSS-REFERENCE TO RELATED APPLICATIONS

Figure 1:
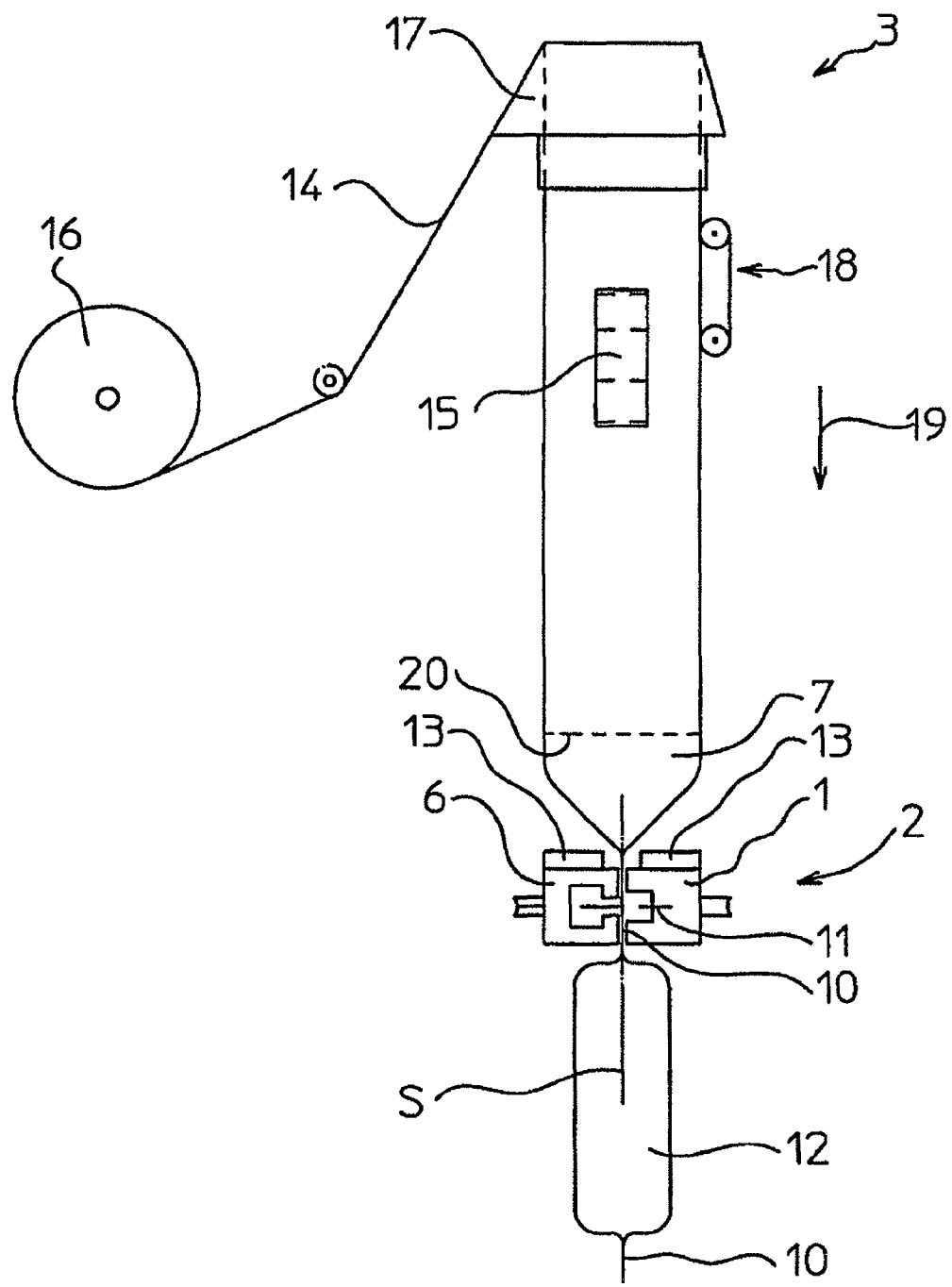

This patent application claims the benefit of priority from German Patent Application No. 10 2010 050 008.9, filed on Nov. 2, 2010, the contents of which are incorporated herein by reference in its entirety.

The proposed innovation relates to packaging machine construction and a method for creating a welding force and/or a welding pressure for a welding jaw, in particular a welding jaw of a cross-sealing station of a vertical tubular bag machine.

From DE 44 25 207 A, it is known that a welding jaw of a cross-sealing station of a vertical tubular bag machine may be moved along a closed path. The path here has a straight section, which is provided for contact with a tubular film compressed between the welding jaw and the second opposing welding jaw. The tubular film and the welding jaws are moved further in the direction of the straight section at the same speed or at a different speed in order to weld the tubular film by means of heat introduced into the tubular film via the sealing surfaces of the welding jaws at a pressure exerted in a sealing plane within a sealing time under a sealing force. A drive is provided to move the welding jaw in a direction normal to a surface of the resistance in order to perform the welding operation in a stationary position or along an effective sealing path within the sealing time, and the sealing force can be preselected.

In the case of another vertical tubular bag machine, only one drive is provided for moving two welding jaws that are movable toward and away from one another only in the horizontal direction, moving each along a linear path, to weld a tubular film across its direction of conveyance when the film is at a standstill.

DE 10 2004 049 376 A1 describes a sealing method in which the sealing force is predetermined by a control unit of the drive during the sealing time and is thus preselectable as a function of time in any desired manner during the entire sealing time.

The known methods and devices have the disadvantage that the sealing force curve and/or the sealing pressure curve resulting from the amount of sealing area and the sealing force always has/have only a relative maximum.

The sealing force curve has a parabolic characteristic in the method described in DE 10 2004 049 376 A1. All the known methods are characterized jointly in that the characteristic of the sealing force curve rises up to a maximum force, is optionally kept constant for a certain period of time at this maximum force and then declines along the sealing force curve to the zero level when the jaws are opened. It is characteristic here that the sealing force increases continuously until reaching the maximum sealing force, such that this increase in the sealing force may have a linear, arc-shaped or parabolic sealing force curve until reaching the maximum force. With the known sealing method, the goal is to achieve the maximum force as soon as possible, which means that after the sealing jaws are closed, the sealing force should be increased at the greatest possible rate of increase.

Studies have now shown that this type of sealing is not efficient and necessitates unnecessary expense with regard to the energy demand and/or the machine equipment, because analyses of the processes taking place during sealing have shown that for heating of the tubular film per se, only a relatively low sealing pressure is required. Only when the tubular film has reached a temperature so that it is at least partially plastified must the sealing force be increased to the previously known level to ensure reliable sealing. In other words, this means that an unnecessarily high force is expended with a previously known sealing method during the heating of the tubular film while the sealing jaws are closed, so that in this part of the sealing process, unnecessary drive energy must be expended. Furthermore, the drive had to be designed for applying the sealing force to the corresponding high continuous load.

Against the background of this prior art, an object of the embodiments of the present invention is therefore to propose a novel sealing method for creating a welding force and/or a welding pressure for a welding jaw, in particular a welding jaw of a cross-sealing station in a vertical tubular bag machine, which can be performed with a high energy efficiency and with reduced equipment expenditure.

The sealing method according to the embodiments of the present invention is based on the fundamental idea that the sealing force curve acting on the tubular film has a first relative sealing force maximum and a second relative sealing force maximum, such that the sealing force of the second sealing force maximum is higher than the sealing force of the first sealing force maximum. In other words, this means that in sealing the tubular film and in running through the sealing force curve accordingly, the sealing force rises first up to the first sealing force maximum. Then after reaching the first sealing force maximum, the sealing force may either be kept constant or may drop to a certain extent. Only in the remaining course does the sealing force then increase up to the second sealing force maximum, such that the sealing force of the second sealing force maximum is higher than the sealing force of the first sealing force maximum. It is naturally also conceivable that the sealing force may pass through additional sealing force maximums. Fundamentally, with regard to the invention, it should be pointed out that the sealing force, the sealing pressure and the motor drive power of the sealing jaws are variables that are to be regarded as correlating parameters.

Since the lower first sealing force maximum occurs before the higher second sealing force maximum, the result is that the sealing force rises only to a relatively low level at the start of the sealing process, such that this sealing force level is then sufficient to input heat from the welding jaws into the material of the tubular film. Only when the tubular film has been heated to a sufficient extent does the sealing force then rise to the second sealing force maximum so that welding is performed with the desired weld quality. Due to the reduction in the sealing force in the first part of the sealing operation until the start of the second sealing force maximum, a substantial portion of the drive energy may be saved for applying the sealing force. Furthermore, the drive for driving the sealing jaws, which is necessary for applying the sealing force, may be designed to be weaker accordingly, thus yielding a lighter design and greater drive dynamics. Essentially any ratio may be selected for the ratio of the sealing force of the first sealing force maximum to the sealing force of the second sealing force maximum, as long as the sealing force of the second sealing force maximum is at any rate higher than the sealing force of the first sealing force maximum. It has proven to be especially advantageous if the sealing force of the first sealing force maximum is in the range of about 30% to about 70% of the sealing force of the second sealing force maximum. It is especially advantageous if the sealing force of the first sealing force maximum amounts to approximately half of the sealing force of the second sealing force maximum and is thus in the range of about 45% to about 55%.

Investigations with regard to the quality of the sealed seams have also shown that the sealing quality of the weld depends essentially on maintaining the sealing force during the first sealing force maximum, whereas the exposure time of the sealing force of the second sealing force maximum has only a very minor influence. In other words, this means that a very high-quality seal can be achieved even with only very short-term application of the sealing force of the second sealing force maximum very briefly. According to a preferred variant of the method, it is therefore provided that the sealing force of the second sealing force maximum is formed by a short-term force peak. This short-term force peak and the short-term pressure pulse associated with it are sufficient to produce a sealed seam having a sufficient sealing quality.

If it is provided according to the proposed variant of the method that the sealing force of the second sealing force maximum is formed by a short-term force peak, then it is also advantageous if this short-term force peak is generated by short-term overload operation of the drive of the welding jaws. The power of the drive in overload operation should be higher than the maximum power of the drive in continuous load operation. As a result, it is thus possible for the drive of the welding jaws to be designed to operate at a lower load level, because the short-term force peaks for sealing the sealed seam can be achieved by a short-term overload operation. Conventional drive motors and the respective power electronics are usually tolerant with regard to a short-term overload, so the drive unit can be designed with a lower load level accordingly and is therefore also lighter and less expensive.

To be able to achieve the sealing force of the second sealing force maximum in the shortest possible time after the film of the tubular film has been heated sufficiently, the slope of the flank on the sealing force curve immediately before reaching the first sealing force maximum should correspond to the maximum power of the drive in overload operation.

Essentially it does not matter how the sealing force curve runs between the first sealing force maximum and the second sealing force maximum. According to a preferred variant of the method, after reaching the first sealing force maximum, the sealing force is kept essentially constant for a holding time, such that this constant force corresponds to the sealing force of the first sealing force maximum.

The holding time during which the sealing force is kept constant at the level of the first sealing force maximum should preferably end only when the material of the tubular film has at least partially fused. At this point in time, the sealing force process can then be continued by increasing the sealing force up to the second sealing force maximum, thereby creating a sealed seam of a high weld quality.

The method according to the present invention is characterized by the sealing force of the first sealing force maximum and the sealing force of the second sealing force maximum, which is higher than the former. To be able to adjust these two parameters variably to different boundary conditions, in particular to different film materials, the sealing force of the first sealing force maximum and/or the sealing force of the second sealing force maximum should be variably adjustable in the drive control unit. The sealing force curve can therefore be adapted variably to the different boundary conditions, in particular to the different film materials.

It is also especially advantageous if the process time until reaching the first sealing force maximum and/or the process time until reaching the second sealing force maximum and/or the holding time is/are variably adjustable in the drive control unit in order to be able to optimally adapt the sealing force curve to the boundary conditions of the process.

The sealing force curve after passing through the second sealing force maximum may be essentially of any type. For example, it is conceivable that it will then pass through additional sealing force maximums. According to a first preferred variant of the process, it is provided that the sealing force is brought to zero by opening the welding jaws after passing through the second sealing force maximum. In other words, this means that after passing through the second sealing force maximum, the sealing force drops to zero within a short period of time.

As an alternative to this first variant of the process, it is also conceivable for the sealing force to be reduced to an interim value after passing through the second sealing force maximum and then be kept constant. At the end of this constant force phase, during which the sealing force is kept at the interim level, the sealing force is then brought back to zero by opening the welding jaws.

The proposed method is suitable in particular for vertical tubular bag machines operated in cycles. With such a packaging machine, the two welding jaws of a cross-sealing station may be moved along a linear path. It is preferable here for the welding jaws to be moved along a closed path having a straight section, such that the welding jaws moving with the tubular film will weld the tubular film along this straight section while the tubular film is moving.

Figure 2:
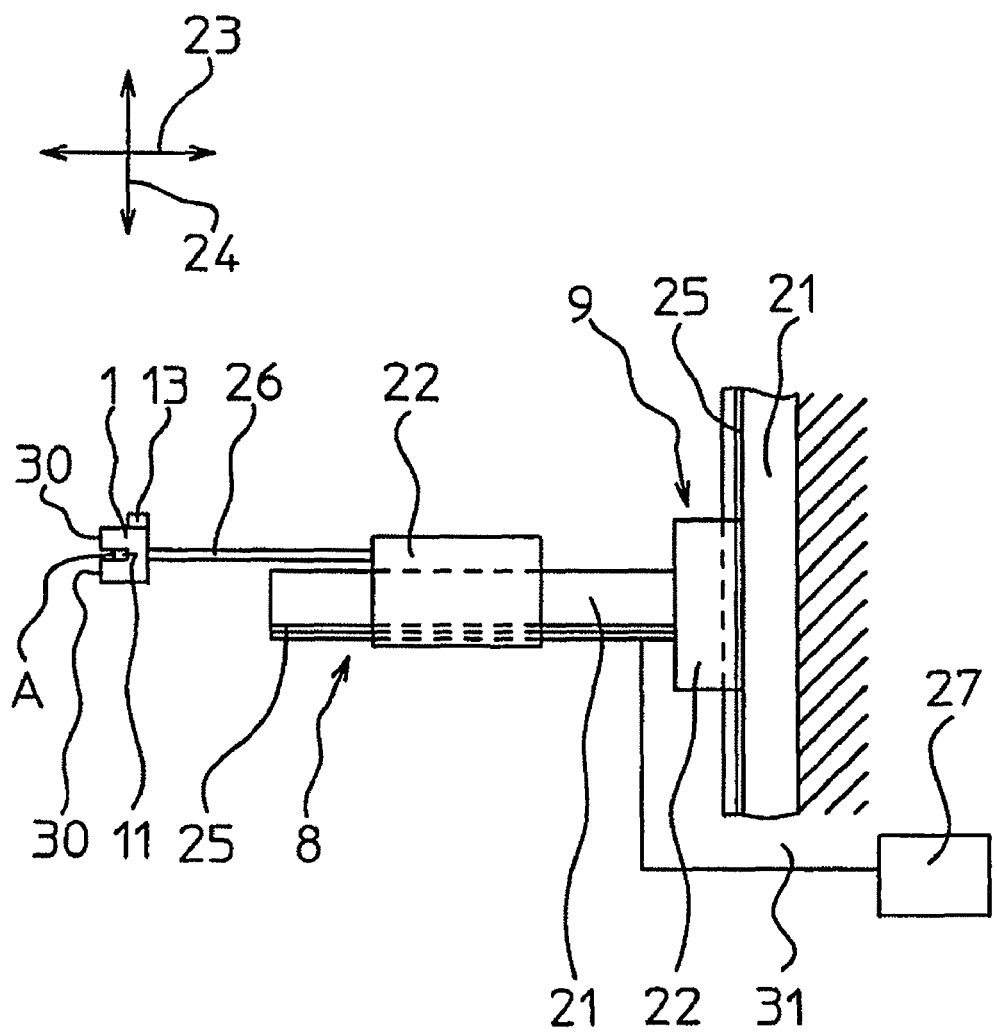
Figure 3:
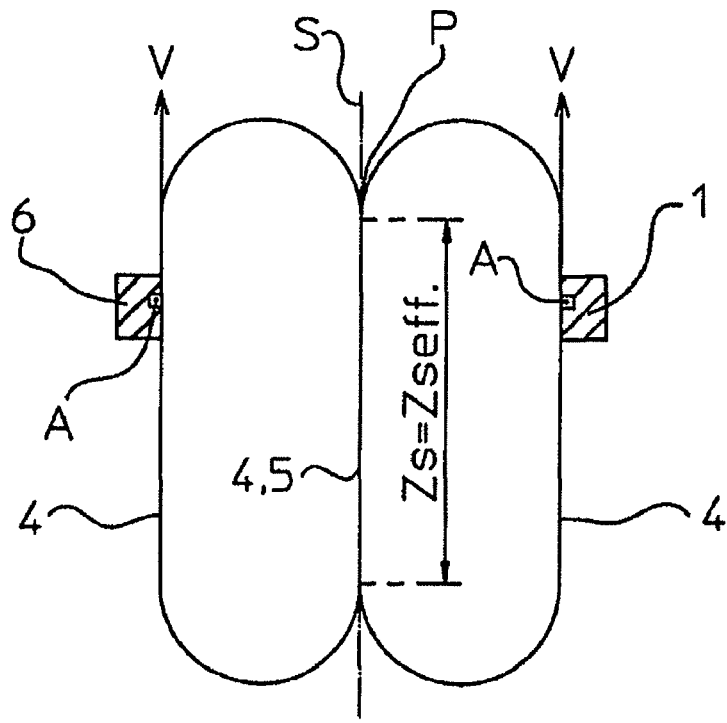
Figure 4:
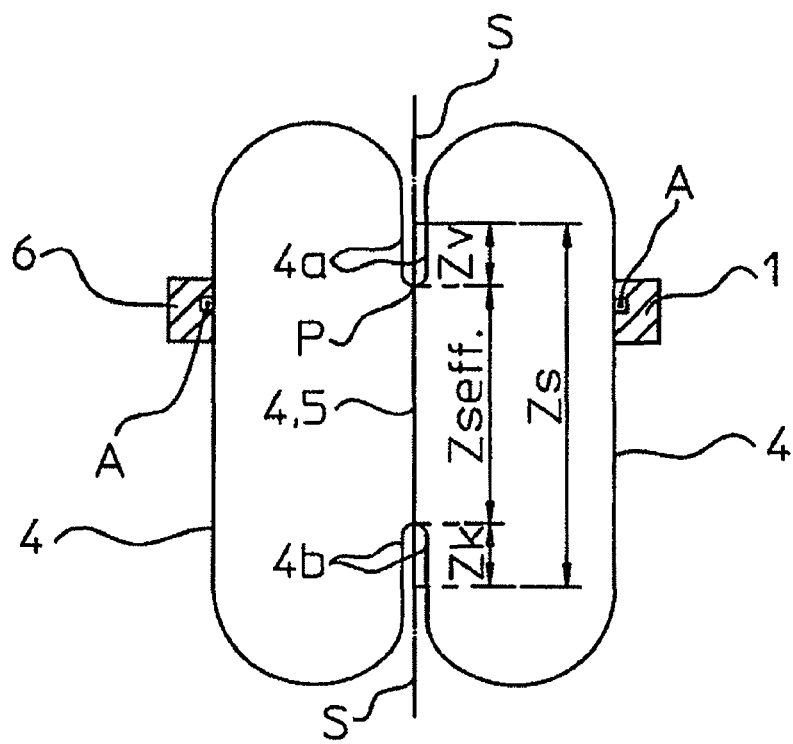
Figure 5:
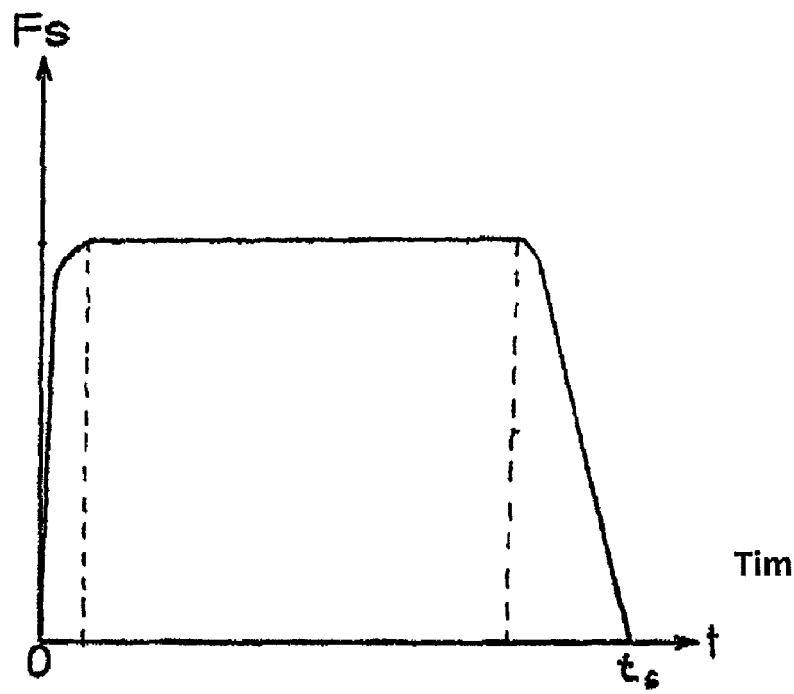
Figure 6:
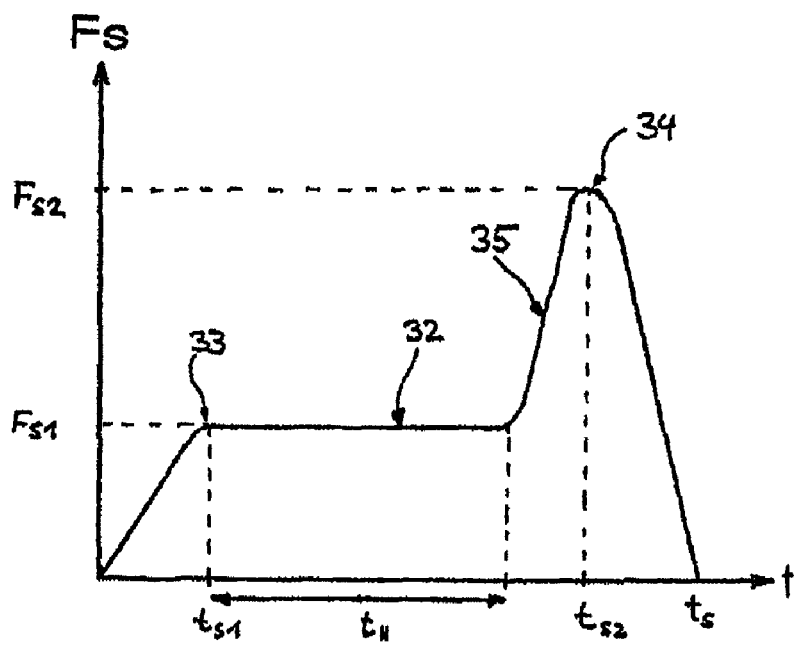

The proposed method and a vertical tubular bag machine that can be operated by the proposed method are described below in greater detail on the basis of figures showing an exemplary embodiment. They show:

FIG. 1: a side view of a vertical tubular bag machine having welding jaws of a cross-sealing station, the jaws being movable toward one another;

FIG. 2: a side view of two drives acting at right angles to one another for moving a moving point A of the one welding jaw of FIG. 1 along a peripheral path;

FIG. 3: a schematic diagram of the path of two welding jaws movable toward one another, which weld the tubular film according to FIG. 1 along an effective sealing path and which abut against one another at an impact point P;

FIG. 4: a schematic diagram of the welding jaw path according to FIG. 3, but with an effective sealing path, reduced by a preheating zone and a cooling zone, and another impact point P;

FIG. 5: a diagram showing the known functional relationship achieved by the traditional technique between time and the sealing pressure for the welding jaws of a cross-sealing station of a vertical tubular bag machine;

FIG. 6: a diagram of a sealing force profile according to the invention.

In a vertical tubular bag machine 3, a film web 14 is pulled from a supply roll 16 by means of a draw-off device 15, passed over a shaping shoulder 17 and shaped to form a tubular film 7 (FIG. 1). The tubular film 7 is welded by a longitudinal sealing device 18 in the direction of conveyance 19 and is filled by a filling tube 20. Two peripheral welding jaws 1, 6, which are movable toward one another, serve to weld the tubular film 7 across the direction of conveyance 19 by means of transverse seams 10. A cutting mechanism 11 in one welding jaw 1 serves to sever a tubular bag 12 having a certain bag length from the tubular film 7. The welding jaws 1, 6 are operated in such a way that they run in opposite directions to perform the welding of the tubular film 7, which is moving downward at the same speed as the welding jaws 1, 6, along an effective sealing path Zseff (FIG. 3). To do so, the two welding jaws 1, 6 are moved along a closed path 4. Each path 4 has a straight section 5, which is provided for contact with the tubular film 7 compressed between the welding jaws 1, 6. The tubular film 7 and the welding jaws 1, 6 are moved further in the direction of the straight section 5 at a freely programmable speed to weld the tubular film 7 by the ultrasonic action of the welding jaws 1, 6 within a sealing time ts.

However, a sealing path Zs could also be provided, comprised of a preheating zone Zv for preheating the object with a welding jaw 1 at a distance from the object, the actual effective sealing distance at Zseff and a cooling zone Zk for cooling the object, while the welding jaw 1 is at a distance from the object, and while cooling air is blown onto the object from a cooling air outlet 13 provided on the welding jaw 1 (FIG. 4). In order for this adjustment of the sealing paths Zs with all the positional and chronological parameters to be readily possible, a section 4a, 5, 4b, which runs parallel to the straight section 5, is freely selectable with respect to its length and its position coordinates, and along which the moving point A being moved, was selected for the preheating zone Zv, the effective sealing distance Zseff and the cooling zone Zk, along this section. To do so, the drives 8, 9 (FIG. 2) are operated so that the two drives 8, 9 are operated simultaneously along a path curvature and only the drive 9 is used along a straight section 4a, 5, 4b, so that a moving point A of the welding jaws 1, 6 is freely selected at each point describing the path 4, being assigned to a predetermined speed V and a predetermined acceleration a in the direction of a freely selected direction of movement of the moving point A. In other words, the straight sections 4a, 5, 4b as well as their precise lengths and position coordinates can be freely programmed. Thus, precisely predetermined speeds may be preselected at precisely predetermined locations, and to achieve smooth movement of the jaws, precisely predetermined accelerations may also be preselected for the welding jaws 1, 6. The reset time for renewed positioning of the welding jaws 1, 6 on the tubular film 7 and the cycle time (time for one revolution of the jaws) may also be selected freely. Corresponding software creates the desired dependence of preselected parameters and informs one of input data that does not fit together.

For the moving point A to be movable to a precise position, two drives 8, 9 acting at right angles to one another, each being embodied as electric drives, are provided for moving the welding jaws 1, 6. These may be two electromagnetic linear drives, for example. Instead of such linear drives, however, any other drive configurations, in particular with geared motors, are also conceivable. These drives 8, 9 are connected to a control unit 27 (via a line 31). To prevent any positional inaccuracy, the two drives 8, 9 are each connected to one another and to a welding jaw 1, 6 without gears. Furthermore, shifting elasticity is prevented by the fact that each welding jaw 1, 6 is connected to the movable part 22 of the horizontally acting drive 8 via a rigid connection 26, and the driving part 21 of this drive 8 is rigidly connected to the part 22 of the other drive 9 which is movable in the vertical direction. The freely selectable position coordinates allow an ideal movement of the jaws at each point on the path 4, even in the case of a relatively complex path.

The sealing surfaces 30 of the welding jaws 1, 6 strike one another at an impact point P (FIG. 3, FIG. 4) beyond which an effective sealing path Zseff begins. This impact point P lies in a sealing plane S. To achieve a gentle impact of the sealing surfaces 30 and thus to build up a sealing force (Fs), the normal component $V_N$ of a moving point A situated centrally or eccentrically in a sealing surface plane is controlled through corresponding control of the two drives 8, each of which moves one welding jaw 1, 6 in the normal direction, by the control unit 27, which is connected via a line 31 (FIG. 2) to a driving part 21 of a drive 8.

The sealing force Fs is predetermined by a control unit 27 of a force control of the drive 8 during the sealing time ts. In the case of cycled film transport, each welding jaw 1, 6 is moved along a linear path, and when the film is at a standstill and the welding jaws 1, 6 are in contact with the tubular film 7, a time-dependent sealing force Fs is predetermined by the control unit 27 during the sealing time ts. As an alternative to this in the case of continuous film transport, each welding jaw 1, 6 is moved along a closed path 4, which has a straight section 5, along which the welding jaw 1, 6 moving with the tubular film in the case of a moving tubular film 7 welds the tubular film 7, whereupon the sealing force Fs is predetermined by the control unit 27 as a function of time during the sealing time. Within the sealing period, a sealing force profile is achieved, because the drive 8, which generates the normal component and the sealing force Fs, is connected to the control unit 27 which preselects a chronological characteristic for the power consumption by the drive 8 and thus predetermines the sealing force 27. It does not matter whether the power consumption per se or a variable correlating with the power consumption is controlled and then is regulated as a function of time until reaching the sealing time ts.

In the known prior art (FIG. 5), the sealing force curve has an almost rectangular characteristic. The sealing force increases steeply up to its maximum value and is kept constant there for a certain sealing time. At the end of the sealing time, the jaws are then opened again and the sealing force drops to the value zero. A great deal of energy is squandered by this sealing force characteristic, which is known in the prior art, because a high sealing force is not necessary at the start of the sealing process in order to achieve a high-quality seal. A much lower pressing force is sufficient for input of the necessary heat into the material of the tubular film.

FIG. 6 shows the sealing force curve in one exemplary embodiment of the method according to the invention. Accordingly, the sealing force curve according to the invention initially increases up to the sealing force Fs1 at a first relative sealing force maximum 33. As soon as the curve passes through this first sealing force maximum 33, the sealing force is kept constant for a holding time tH. At the end of the holding time tH, the sealing force 32 is then increased up to the sealing force Fs2 of the second sealing force maximum 34. The duration of the holding time tH is adjusted, so that the film to be welded is at least partially fused on reaching the end of the holding time tH. The sealing force maximum 34 forms a short-term force peak, which is transferred to the film in a short-term maximum pressure pulse. To create this short-term force peak of the sealing force characteristic at the second sealing force maximum, the drive 8 and/or the drive 9 of the two welding jaws is/are operated briefly in overload mode, so that in normal operation, the drives 8 and 9 can be designed with smaller dimensions accordingly. After passing through the second sealing force maximum 34, the welding jaws 1 and 6 are moved away from one another, and the sealing force 32 therefore drops to a level of zero. To be able to increase the sealing force 32 to the second sealing force maximum 34 as quickly as possible after the end of the holding time tH, the slope of the flank 35 on the sealing force curve 32 immediately before reaching the second sealing force maximum corresponds to the maximum power of the drive 8 and/or 9 in overload operation.

The invention claimed is:

1. A method for creating a welding force and/or a welding pressure for a welding jaw, in particular a welding jaw of a cross-sealing station of a vertical tubular bag machine, wherein the welding jaw is moved back and forth along a linear path or is moved along a closed path to strike a resistance, in particular a second welding jaw moving in the opposite direction, wherein a tubular film is compressed between the resistance and at least one of the sealing surfaces of the welding jaws to weld the tubular film by means of ultrasonic vibrations applied to the tubular film via the sealing surface at an applied pressure in a sealing plane (S) under a sealing force (Fs) within a sealing time (ts), and wherein at least one drive is provided to move the welding jaws back and forth in a direction normal to the surface of the resistance in order to perform the welding operation in a stationary position or along an effective sealing path (Zseff) within the sealing time (ts), and wherein the sealing force (Fs) or a sealing parameter which correlates with the sealing force (Fs), in particular the sealing pressure or the drive power of the drive, is predetermined by a control unit during the sealing time (ts), such that the sealing force (Fs) runs along a sealing force curve within the sealing time (ts),
wherein
the sealing force curve has a first relative sealing force maximum with a sealing force (Fs1), and has at least one second relative sealing force maximum with a sealing force (Fs2), such that the sealing force (Fs1) at the first sealing force maximum is lower than the sealing force (Fs2) at the second sealing force maximum.

2. The method according to claim 1, wherein
the sealing force (Fs1) of the first sealing force maximum is in the range of about 30% to about 70% of the sealing force (Fs2) of the second sealing force maximum.

3. The method of claim 1 wherein the sealing force (Fs1) of the first sealing force maximum is in the range of about 45% to about 55% of the sealing force (Fs2) of the second sealing force maximum.

4. The method according to claim 1, wherein
the sealing force (Fs2) of the second sealing force maximum is formed by a short-term force peak.

5. The method according to claim 3, wherein
the short-term force peak of the second sealing force maximum is generated by short-term overload operation of the drive of the welding jaws.

6. The method according to claim 1, wherein
the slope of the flank of the sealing force curve immediately before reaching the second sealing force maximum corresponds to the maximum power of the drive in overload operation.

7. The method according to claim 1, wherein
after reaching the first sealing force maximum, the sealing force (Fs) is kept essentially constant at the sealing force (Fs1) of the first sealing force maximum for a holding time (tH).

8. The method according to claim 6, wherein
the holding time (tH) ends only when the material of the tubular film is at least partially molten.

9. The method according to claim 1, wherein
the sealing force (Fs1) of the first sealing force maximum and/or the sealing force (Fs2) of the second sealing force maximum is/are variably adjustable in the drive control unit.

10. The method according to claim 1, wherein
the time (ts1) until reaching the first sealing force maximum and/or the time (ts1) until reaching the second sealing force maximum and/or the holding time (tH) is/are variably adjustable in the drive control unit.

11. The method according to claim 1, wherein
after passing through the second sealing force maximum, the sealing force is brought to zero by opening the welding jaws.

12. The method according to claim 1, wherein
after passing through the second sealing force maximum, the sealing force (Fs) is reduced to an interim value and then is held, in particular being kept constant, and only thereafter is brought to zero by opening the welding jaws.

13. The method according to claim 1, wherein
the welding jaws are moved along a closed path having a straight section along which the welding jaws moving with the tubular film weld the tubular film while the latter is moving.

* * * * *